(12) United States Patent
Johnson et al.

(10) Patent No.: US 6,276,033 B1
(45) Date of Patent: Aug. 21, 2001

(54) SECURITY TAG HOUSING

(75) Inventors: Page L. Johnson, Lebanon; Stephen W. Sliger, Mason; David J. Nesbitt, Cincinnati, all of OH (US)

(73) Assignee: LensCrafters, Inc., Cincinnati, OH (US)

( * ) Notice: Subject to any disclaimer, the term of this patent is extended or adjusted under 35 U.S.C. 154(b) by 0 days.

(21) Appl. No.: 09/072,488

(22) Filed: May 4, 1998

Related U.S. Application Data

(60) Provisional application No. 60/045,618, filed on May 5, 1997.

(51) Int. Cl.⁷ ..................................................... A44B 21/00
(52) U.S. Cl. ...................... 24/704.1; 40/299.01; 40/666; 24/3.1
(58) Field of Search ..................................... 292/318–322; 70/57.1; 24/704.1, 3.1; 340/572; 40/666, 299.01; 351/52

(56) References Cited

U.S. PATENT DOCUMENTS

| | | | |
|---|---|---|---|
| 1,543,397 | * | 6/1925 | Schroeder . |
| 1,930,560 | * | 10/1933 | Keidel . |
| 4,500,124 | * | 2/1985 | Swift . |
| 4,774,503 | * | 9/1988 | Bussard . |
| 4,993,245 | * | 2/1991 | Ott . |
| 5,079,540 | * | 1/1992 | Narlow et al. . |
| 5,119,652 | * | 6/1992 | Costa . |
| 5,140,836 | * | 8/1992 | Hogan et al. . |
| 5,144,820 | * | 9/1992 | Holmgren . |
| 5,421,177 | * | 6/1995 | Sieber et al. . |
| 5,437,172 | * | 8/1995 | Lamy et al. ..................... 24/704.1 X |
| 5,767,773 | * | 6/1998 | Fujiuchi et al. . |
| 5,775,018 | * | 7/1998 | Steinborn . |
| 5,864,290 | * | 1/1999 | Toyomi et al. . |

* cited by examiner

*Primary Examiner*—James R. Brittain
(74) *Attorney, Agent, or Firm*—Frost Brown Todd LLC

(57) ABSTRACT

A security tag holder and fastener assembly by which a security tag can be attached to a product to be tagged. The security tag holder comprises a housing adapted to receive and support the security tag. The tag-containing housing is attachable to a product and is maintained in attached condition by at least one fastener member. The security tag and housing can be removed from the product only by destruction of the at least one fastener member. The security tag and housing are reusable.

28 Claims, 7 Drawing Sheets

SECURITY TAG HOUSING

REFERENCE TO RELATED APPLICATION

This application claims priority benefit of U.S. Provisional Application, Ser. No. 60/045,618, filed May 5, 1997 in the names of Page L. Johnson, Stephen W. Sliger, and David J. Nesbitt and entitled SECURITY TAG HOUSING AND ATTACHMENT CLIPS THEREFORE.

TECHNICAL FIELD

The invention relates to a housing for a security tag together with one or more fasteners for attaching the housing to the product to be tagged, and more particularly to such a housing which fully receives the security tag; which is reusable; and which cannot be removed from the product without destroying the one or more attachment fasteners.

BACKGROUND ART

The present invention is directed to security tags of the type which, when they are caused to pass by appropriate sensor means, will set off an alarm, a silent alarm, or other appropriate security signal. Security tags of the type described have a great many uses. For example, such tags are used in large numbers in retail establishments to prevent shoplifting. The size and nature of the security tag does not constitute a limitation of the present invention. The same is true of the product to be tagged. For example, the security tag housing and attachment clips of the present invention could be applied to jewelry, clothing, or the like. For purposes of an exemplary showing, the present invention will be described in its application to the tagging of eyeglass frames. An exemplary and commonly used security tag in retail businesses and for other purposes is that manufactured by Sensormatic of Deerfield Beach, Florida, and is generally known as a rattler type security tag. The security tag is a relatively small, thin, rectangular element approximately 1.72" long, 0.72" wide and about 0.06" thick. The security tag is generally affixed to the temple of an eyeglass frame. This is accomplished by the use of tape wrapped about the temple and the security tag. This method of attaching the tag to the eyeglass frame temple has a number of drawbacks. For example, the tape wrapping operation is time consuming. Furthermore, the security tag is relatively easily removed by a shoplifter through the use of a ring knife, a pocket knife, or a razor blade to sever the tape. Finally, at the time of the sale when the security tag is removed from the eyeglass frame, the tape generally leaves a sticky residue on the frame temple. Sometimes, removal of sticky residue from the temple can result in marring the temple. Since the security tag has several layers of tape on it, it is common practice to dispose of the security tag. Reuse of the security tag would result in considerable savings were it not for the time and effort required to remove the tape and any sticky residue from the tag.

The present invention is based upon the discovery that security tag may be located in a housing which may be attached to the temple of the eyeglass frame by fasteners such as clips. These clips can serve a multiple purpose. First of all, they attach the security tag housing to the temple. They can be configured to maintain the housing in a preferred orientation which does not interfere with the trying on of the eyeglass frames. The clips will not mar or leave a sticky residue on the frame temple, and the housing cannot be removed from the frame temple without cutting and destroying the clips. Finally, by substituting new clips, the security tag and the housing can be used over and over again.

DISCLOSURE OF THE INVENTION

According to the invention there is provided a security tag holder by which a security tag can be attached to a product to be tagged. The security tag holder comprises a housing configured to receive and support the security tag. The tag-containing housing is attachable to a product and is maintained in attached condition by at least one fastener member. A portion of the product to be tagged is surrounded by a portion of the housing, a portion of the at least one fastener, or portions of both. The security tag and housing can be detached from the product by removal of the at least one fastener member. The security tag and the housing are reusable. The security tag can be removed from the housing and either or both elements can be replaced. The portions of the housing, or the at least one fastener member, or both, may be configured to cooperate with the surrounded product portion in such way as to maintain the housing and the security tag in a desired orientation with respect to the product. The housing may additionally be used to support a label having price information and bar code information printed thereon.

DETAILED DESCRIPTION OF THE INVENTION

Figure 1:
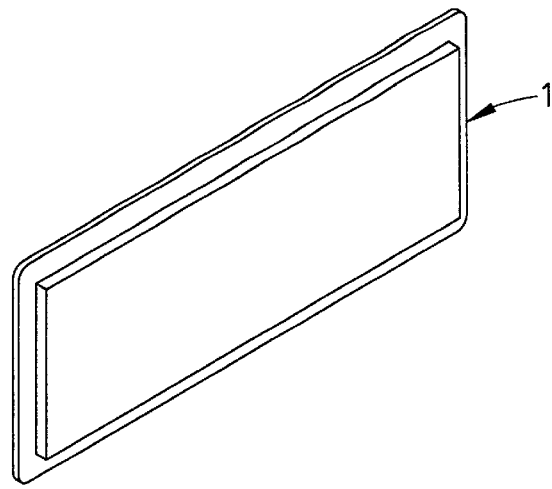
FIG. 1 is a perspective view of an exemplary security tag.

Like parts have been given like index numerals throughout the specification. Reference is first made to FIG. 1 which is a perspective view of an exemplary security tag generally indicated at 1. The tag illustrated is the above-mentioned tag available from Sensormatic of Deerfield Beach, Florida. As indicated above, this particular sensor tag is a thin, rectangular member containing metallic pieces which send off high frequency waves which may be picked up by sensors as the tag is caused to pass therebetween. The sensors, in turn, will activate an appropriate alarm signal.

Figure 2:
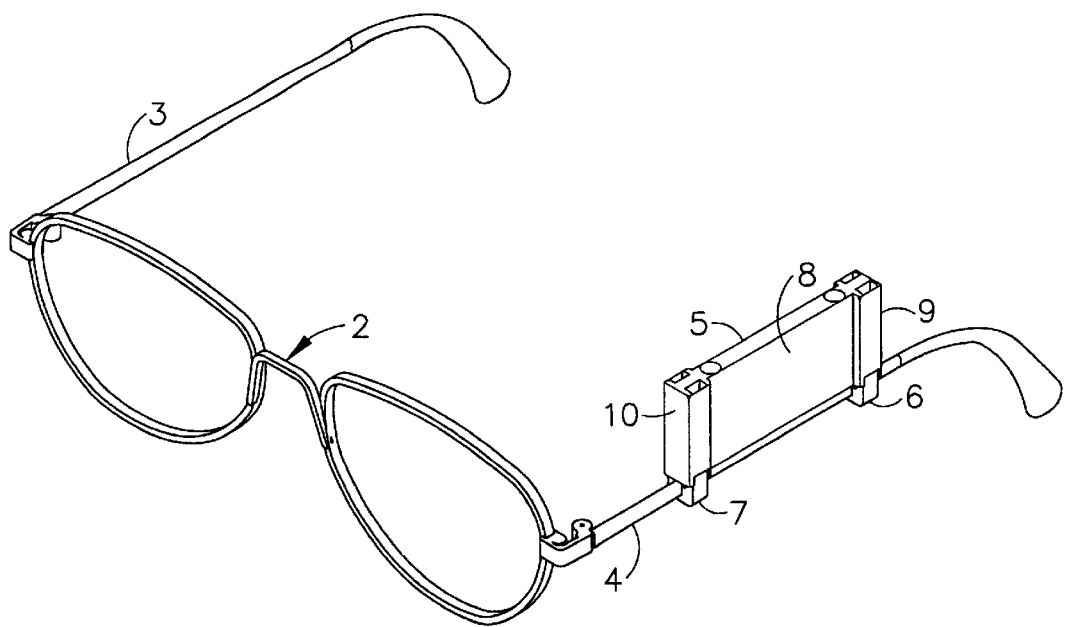
FIG. 2 is a perspective view of an eyeglass frame provided with a security tag-containing housing of the present invention mounted in an upright position on the eyeglass frame temple by clips of the present invention.

Reference is now made to FIG. 2 which is a perspective view of an eyeglass frame, generally indicated at 2. The eyeglass frame 2 is provided with a pair of temples 3 and 4. A housing 5 of the present invention is shown affixed to the temple 4 by a pair of clips 6 and 7. Housing 5 is intended to contain a security tag 1. The housing 5 renders the security tag 1 tamper proof. The housing 5, in conjunction with the clips 6 and 7, maintain the tag at a preferred orientation with respect to temple 4. As will be apparent hereinafter, the housing 5 and clips 6 and 7 can be easily and quickly applied to the temple. The housing 5 and tag 1 therein may be removed from the eyeglass frame temple by means of an appropriate tool which destroys the clips 6 and 7. This cannot be accomplished by means of a simple razor blade, ring knife, pocket knife or the like.

As will be apparent hereinafter, the side of housing 5 has a central planar portion to which a label containing price and bar code information can be affixed. This information could be printed directly on housing 5, if desired. The housing and attachment clips present a far better appearance than the security tag 1 affixed directly to the temple by tape. Furthermore, the housing 5 and security tag 1 can be used over and over again. Only the clips must be replaced. It will be understood by one skilled in the art that although the housing 5 is shown attached to temple 4, it may be attached to temple 3 in the very same way.

Figure 3:
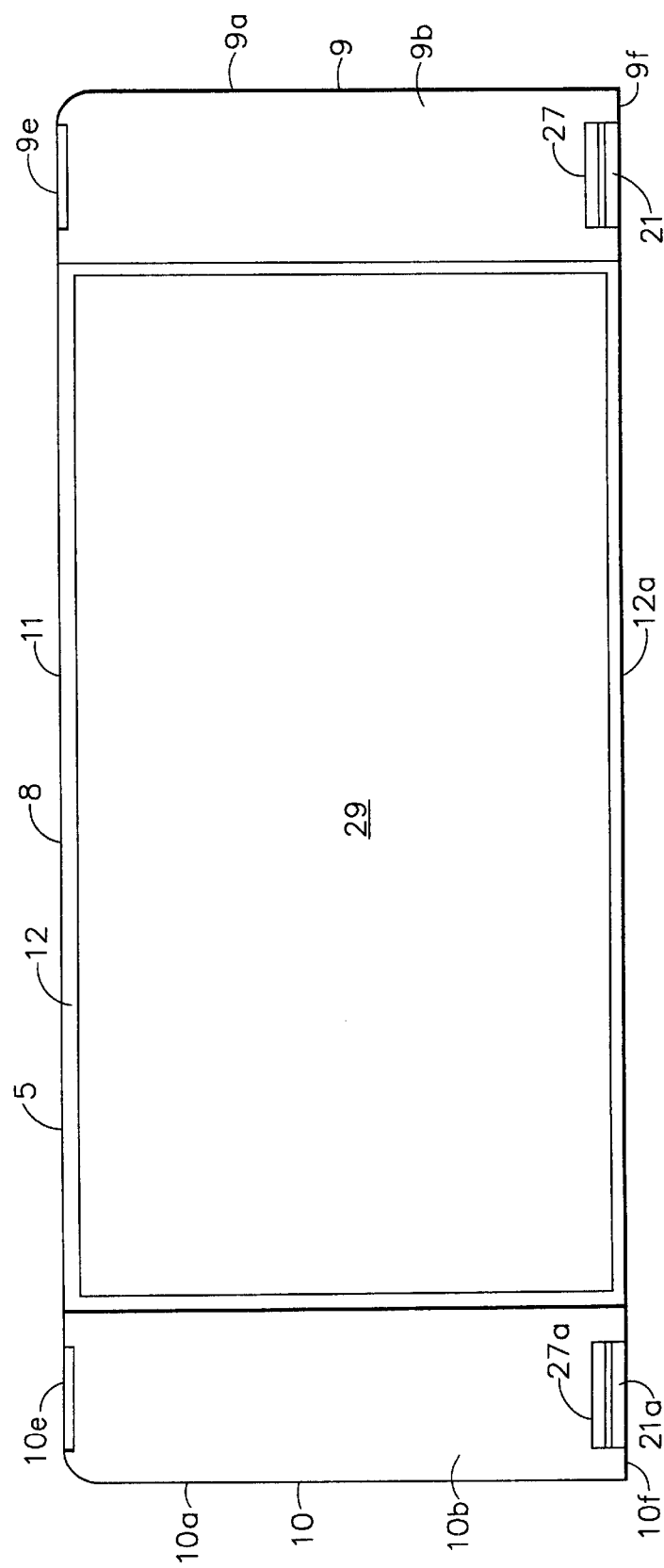
FIG. 3 is a side elevational view of the security tag housing of the present invention.
Figure 4:
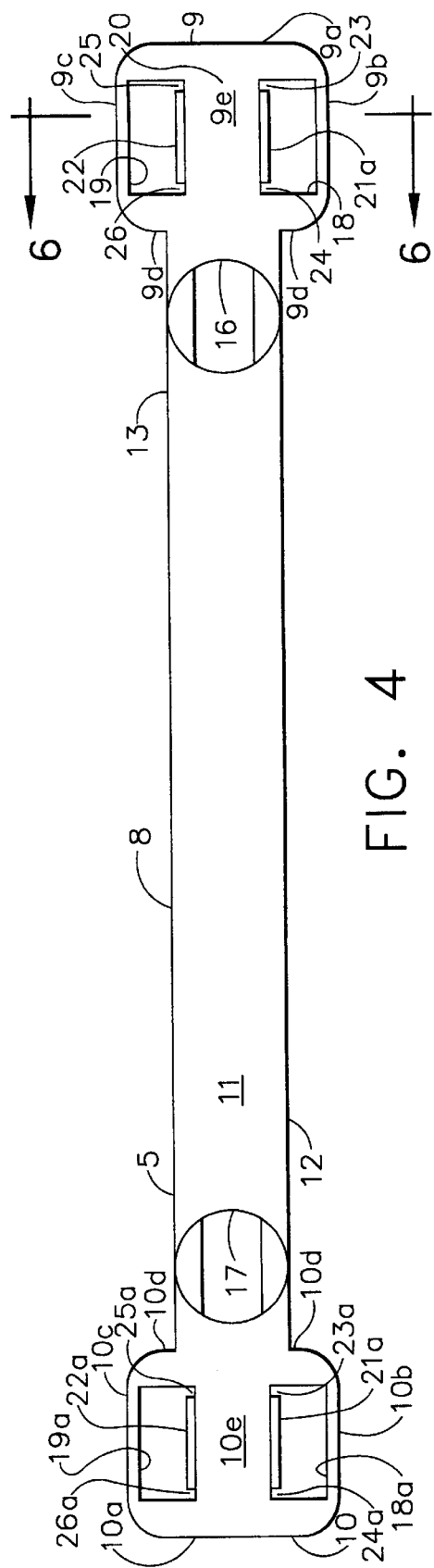
FIG. 4 is a top plan view of the housing of FIG. 3.
Figure 6:
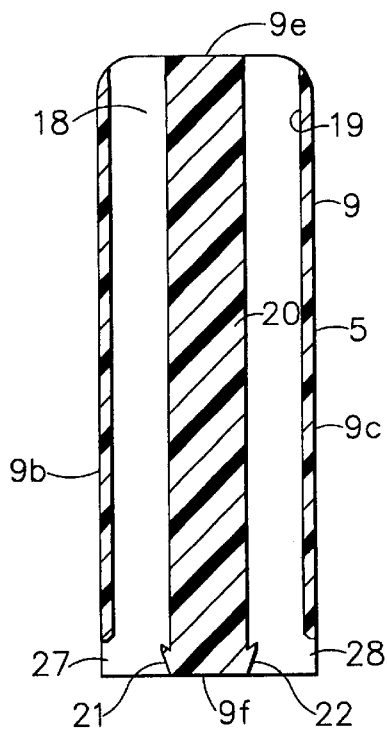
FIG. 6 is a cross-sectional view taken along section 6—6 of FIG. 4.

Reference is now made to FIGS. 3, 4, and 6 wherein the security tag housing 5 is illustrated. Housing 5 has a central pocket portion 8 for receipt of security tag 1. Housing 5 also has end portions 9 and 10 which receive the attachment clips 6 and 7 respectively, as will be apparent hereinafter.

Figure 5:
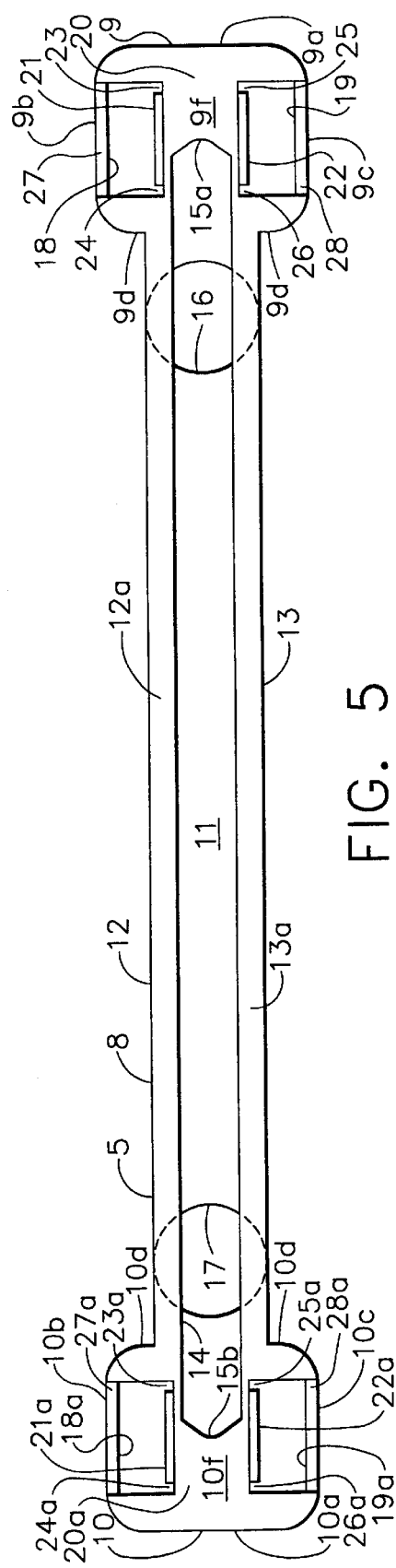
FIG. 5 is a bottom view of the housing of FIG. 3.

The central pocket portion 8 is dimensioned to just nicely accommodate security tag 1 and comprises a closed top 11 and a pair of spaced side walls 12 and 13 (see FIG. 4). As is best shown in FIG. 5, the bottom edges 12a and 13a of side walls 12 and 13 define an opening 14 for access to the pocket 15 formed by side walls 12 and 13 and top 11. The ends 15a and 15b of pocket 15 are closed by end portions 9 and 10, respectively, as shown in FIG. 5.

As will be developed further hereinafter, the housing 5 lends itself well to be molded of plastic and to constitute an integral one-piece molded member. The closed top 11 of the central pocket portion 8 has a pair of holes formed therein. These holes are shown at 16 and 17 in FIGS. 4 and 5. The holes 16 and 17 serve a number of purposes. First of all, they enable the thin mold member which forms the pocket 14 to be additionally supported during the molding procedure. Furthermore, they assist in stripping the housing 8 from the open mold. Finally, through the use of an appropriate two-pronged tool (not shown) they enable a security tag 1 to be easily removed from the housing 5 should either the security tag 1 require replacement or the housing 5 require replacement.

The end portion 9 comprises a rectangular block having sides 9a, 9b, 9c, and 9d. The side 9a constitutes one end of the housing 5. The side 9d, opposite side 9a, is the side from which central pocket portion walls 12 and 13 and top 11 extend. As indicated above, and as shown in FIG. 5, the end 15a of security tag-receiving pocket 15 is closed by end portion 9.

The end portion 9 also has a top 9e and a bottom 9f. End portion 9 has a pair of perforations 18 and 19 in parallel spaced relationship. The perforations 18 and 19 are both of rectangular transverse cross-section; both extend from the bottom 9f to the top 9e of end portion 9; and both are open ended.

Reference is made to FIG. 6, in addition to FIGS. 4 and 5. FIG. 6 is a cross-sectional view taken along section line 6—6 of FIG. 4 and illustrates the perforations 18 and 19. It will be noted that the perforations 18 and 19 define between them a web 20. The web 20, adjacent the bottom surface 19f, is provided with a pair of oppositely directed teeth 21 and 22. The teeth 21 and 22 extend toward the sides 9b and 9c, respectively. It will be noted in FIG. 5 that the tooth 21 does not extend all the way to walls 9a and 9d, forming notches 23 and 24. In a similar fashion, the tooth 22 does not extend all the way to walls 9a and 9d, forming another pair of notches 25 and 26. The notches 23 and 24 and the notches 25 and 26 provide the teeth 21 and 22, respectively, with a requisite amount of flexibility. The purpose of the teeth 21 and 22 will be apparent hereinafter.

It will be apparent to one of ordinary skill in the art that the end portion 10 is a mirror image of end portion 9. End portion 10 has a series of side walls 10a, 10b, 10c and 10d equivalent to the side walls 9a, 9b, 9c and 9d, respectively, of end portion 9. End portion 10 is provided with a pair of perforations of rectangular transverse cross-section 18a and 19a, equivalent to the perforations 18 and 19 of end portion 9. The perforations 18a and 19a define a web 20a equivalent to the web 20 of end portion 9 (see also FIG. 6). The web 20a is provided with a pair of teeth 21a and 22a, identical to the teeth 21 and 22 of end portion 9. The teeth 21 a and 22a are separated from side walls 10a and 10d by notches 23a–24a and 25a–26a, respectively, similar to notches 23–24 and 25–26 of end portion 9. It will be understood that a cross-sectional view through end portion 10 would be substantially the same as that shown in FIG. 6. Again, the purpose of teeth 21a and 22a will be apparent hereinafter.

To complete the housing 5, the bottom edges of sides 9b and 9c of end portion 9 are provided with notches 27 and 28 which are located opposite the teeth 21 and 22, respectively. In a similar fashion, the bottom edges of side walls 10b and 10c of end portion 10 are provided with notches 27a and 28a opposite teeth 21a and 22a, respectively. The purpose of notches 27, 28, 27a and 28a will be apparent hereinafter.

Finally, as is shown in FIG. 3, the exterior of side wall 12 of central pocket portion 8 may be provided with a label 29. The label 29 may bear any appropriate indicia, as for example, pricing information and bar code information. It will be understood that the exterior of the other side 13 of the pocket portion 8 may similarly be provided with an indicia bearing label, if desired. The indicia could be printed directly on the side walls 12 and 13.

Figures 7, 8:
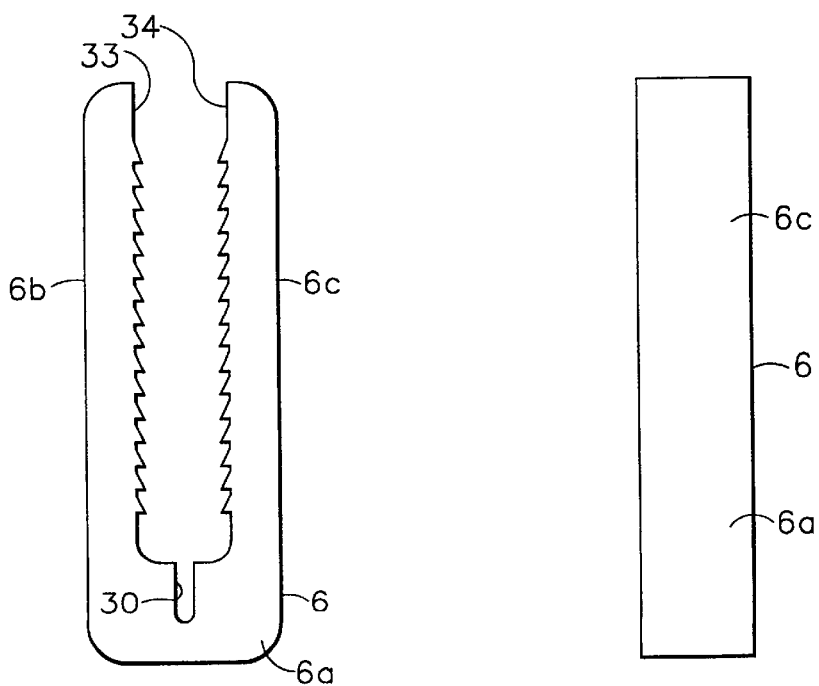
FIG. 7 is an elevational view of an exemplary clip of the present invention.
FIG. 8 is a right side elevational view of the clip of FIG. 7.

Reference is now made to FIGS. 7 and 8 wherein the clip 6 is illustrated. It will be understood that clip 7 is identical to clip 6, and thus a description of clip 6 can stand a description of clip 7 as well.

The clip 6 comprises a U-shaped member having a base portion 6a and upstanding leg portions 6b and 6c in parallel spaced relationship. The base 6a is provided with a centrally located closed end slot 30 which opens into the space between legs 6b and 6c. The inside surfaces of the legs 6b and 6c are provided with sets of teeth 31 and 32, respectively. The sets of teeth 31 and 32 terminate short of the upper ends of legs 6b and 6c, forming smooth pilot surfaces 33 and 34, respectively.

Figure 9:
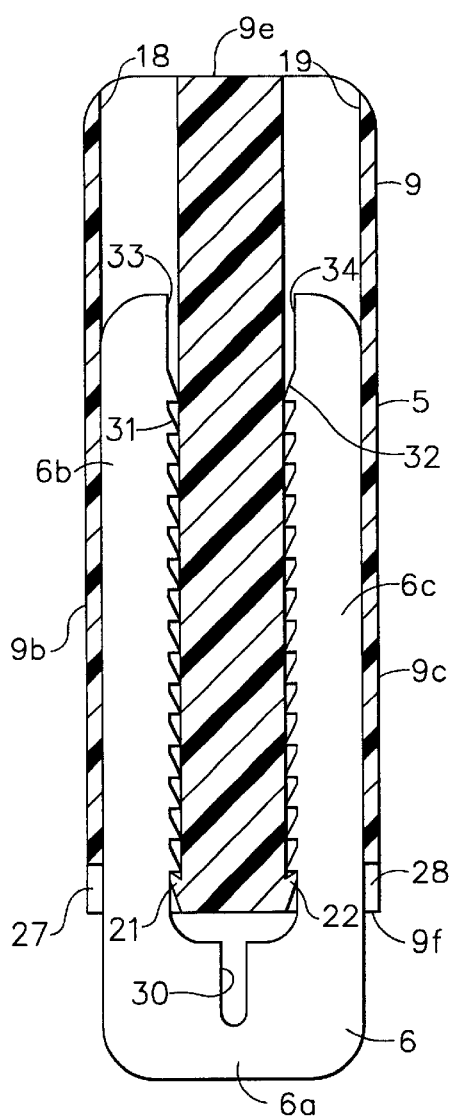
FIG. 9 illustrates the clip of FIG. 7 mounted in an end of the housing.
Figure 10:
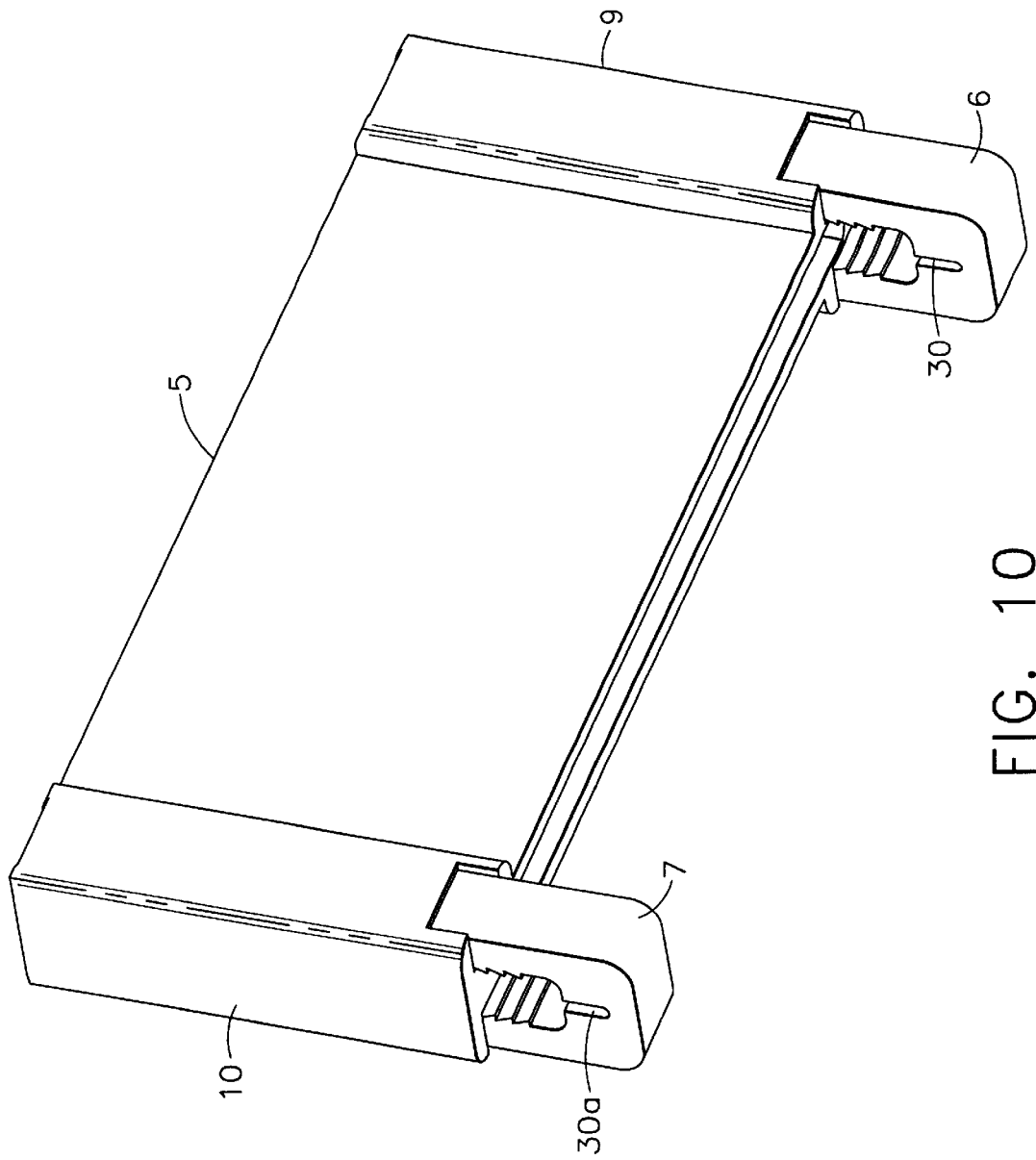
FIG. 10 is a bottom, side and end perspective view of the housing and clip assembly of the present invention.

Reference is now made to FIG. 9, which is similar to FIG. 6, but shows clip 6 mounted in end portion 9 of security tag housing 5. To accomplish this, the U-shaped clip 6 is caused to straddle the temple portion of an eyeglass frame (see FIG. 2). The slot 30 is sized to accommodate the typical temple of a metallic eyeglass frame. Thereafter, the pilot portions 33 and 34 of legs 6b and 6c are caused to enter perforations 18 and 19 in the security tag housing end portion 9. As viewed in FIG. 9 an upward pressure is applied to clip 6a, or a downward pressure is applied to housing 5, or both, causing clip 6 to seat in perforations 18 and 19 in end portion 9. The teeth 21 and 22 are slightly flexible as a result of the material from which they are molded and as a result of the provision of notches 23–24 and 25–26. Slight flexure of legs 6b and 6c as they pass about teeth 21 and 22 is permitted by notches 27 and 28. A determination of the appropriate depth of notches 27 and 28 is well within the skill of the ordinary worker in the art depending upon the purpose to which the housing 5 and clip 6 is to be directed, the size of the housing and clip, and the material from which they are molded. Once clip 6 has been inserted in perforations 18 and 19 and at least the first teeth of sets 31 and 32 have passed teeth 21 and 22, respectively, the clip can no longer be removed from perforations 18 and 19. The depth to which clip 6 will enter the perforations 18 and 19 will depend upon the size of the temple straddled by clip 6. If the temple is completely received within the slot 30, then the clip can be fully seated as shown in FIG. 9. It will be understood by one skilled in the art that the insertion of clip 7 in the bores 18a and 19a of housing end portion 10 is accomplished in the same way, with the same result. Where the housing is to be applied to an eyeglass frame having plastic temples which are thicker than the slot 30 of clip 6 and the slot 30a of the clip 7, the temple may be located between the clip legs and the clips 6 and 7 may be partially inserted in the housing end portion 9 and 10, as shown in FIG. 10. In either instance, i.e. when the temple is located in slot 30 or when the temple is located between the legs 6 and 7, the clips 6 and 7 will usually tend to maintain housing 5 in a particular desired orientation with respect to the temple.

Figure 11:
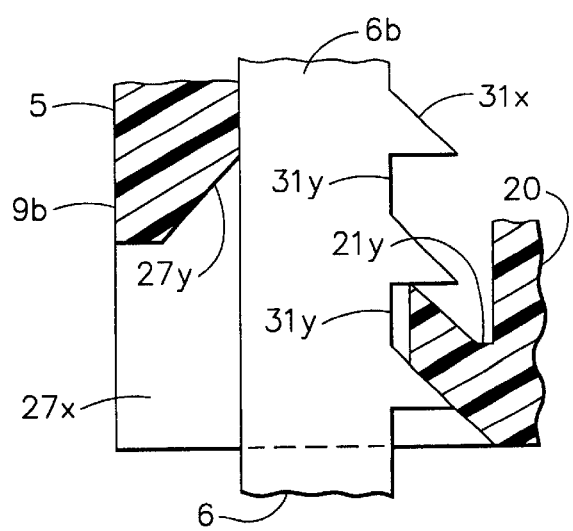
FIG. 11 is a fragmentary cross-sectional view illustrating another embodiment of teeth on the clips.

FIG. 11 is a fragmentary view of the lower left corner of housing 5 as viewed in FIG. 9. FIG. 11 illustrates notch 27x similar to but having a preferred shape slightly different from the shape of the notch 27 in FIG. 9. Furthermore, the tooth 21x of FIG. 11 is differently shaped from the tooth 21 of FIG. 9, as are the teeth 31x of the clip leg 6b when compared to the teeth 31 of FIG. 9. The shapes illustrated in FIG. 11 are preferred. It will be noted that notch 27x has a 45° relief as at 27y. The teeth 31x of the clip have a flat vertical space 31y therebetween. Finally, the tooth 21x of the housing slopes upwardly and outwardly at an angle of 45° and has a flat surface 21y, which adds to its strength. It will be understood that the other notches of the housing will be similarly shaped to notch 27x. All of the clip teeth will be shaped in the manner shown in FIG. 11. The same is true of all of the housing teeth.

As stated above, the housing 5 lends itself well to being injection molded of plastic material. The same, of course, is true of clips 6 and 7. Excellent results have been achieved using acetol copolymer plastic. This plastic demonstrates a lack of shrinkage so that close tolerances can be maintained, adequate strength for both the housing 5 and the clips 6 and 7 and just the right amount of flexibility to enable insertion of clips 6 and 7 into housing 5 and to prevent deformation of the clip teeth 31 and 32 and the housing teeth 21, 22, 21a and 22a. The strength of the plastic material is such that clips cannot be easily severed by a ring knife, a razor blade or a pocket knife. An appropriate cutting tool which exerts greater force is required.

As indicated above, both the security tag 1 and the housing 5 therefor are reusable. When a housing is to be removed from the temple of an eyeglass frame, the clips 6 and 7 are severed at the junction of their legs with their base portions. This frees the housing 5 from the temple easily and without marring the temple. The clip leg portions remaining in the perforations 18, 19, 18a and 19a may be shoved out of these perforations through the upper ends thereof by an appropriate tool. In fact, in most instances the act of reinserting a new set of clips will shove the previous clips out of these perforations.

The manufacture of the housings and clips, including the molding thereof, lends itself well to automation in conventional ways well known in the art. The loading of a security tag in the housing 5 and the application of the housing 5 to the temple of an eyeglass frame also lends itself well to automation. It would be within he scope of the invention to provide some housings with no security tag, or with a simulated security tag, for application to eyeglass frames as a theft deterrent. Some housings may be molded without a pocket 15, for this purpose.

In an exemplary embodiment of the present invention, a housing 5 was molded having an overall length of about 1.98" and a distance from top to bottom of about 0.80". The pocket 15 had an overall length of about 1.73" and a width of about 0.75" to accommodate the sensor 1 of FIG. 1 having a length of about 1.72", a width of about 0.72" and a thickness of about 0.06". The perforations 18, 19, 18a and 19a were substantially identical and had a transverse length of about 0.15" and a transverse width of about 0.7". The housing tooth 21 had a length between notches 23 and 24 of about 0.12" and extended from the web 20 by width of about 0.2". The other housing teeth 22, 21a and 22a were substantially identical.

Clip 6 (see FIG. 7) had an overall length of about 0.75" and an overall width of about 0.24" and a thickness (as viewed in FIG. 8) of about 0.13". Notch 30 had a width of about 0.4" and a length of about 0.8". Each of the clip legs as viewed in FIG. 7 had a width in the pilot areas 33 and 34 of about 0.3". This width increased to about 0.5" in those portions of the legs carrying teeth 31 and 32. The distance between the row of teeth 31 and the row of teeth 32 was about 0.3".

Figure 12:
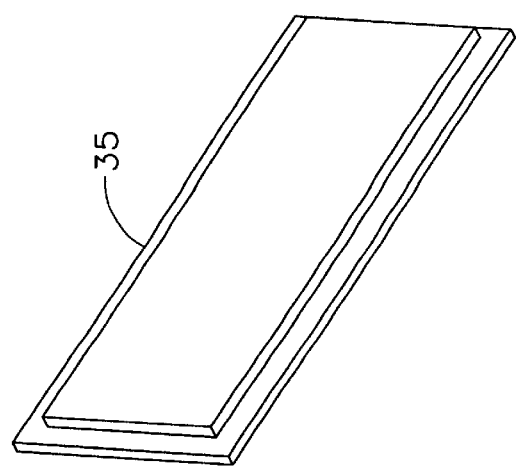
FIG. 12 is a perspective view of another embodiment of security tag.

When the sensors which react to the security tag are sufficient in number and are properly placed, a somewhat smaller security tag and housing may be used. For example, the aforementioned Sensormatic of Deerfield Beach, Florida, makes a smaller rattler type security tag. This smaller security tag has a length of 1.77", a width of 0.42" and a thickness of 0.06". Such a security tag is shown at 35 in FIG. 12.

Figure 13:
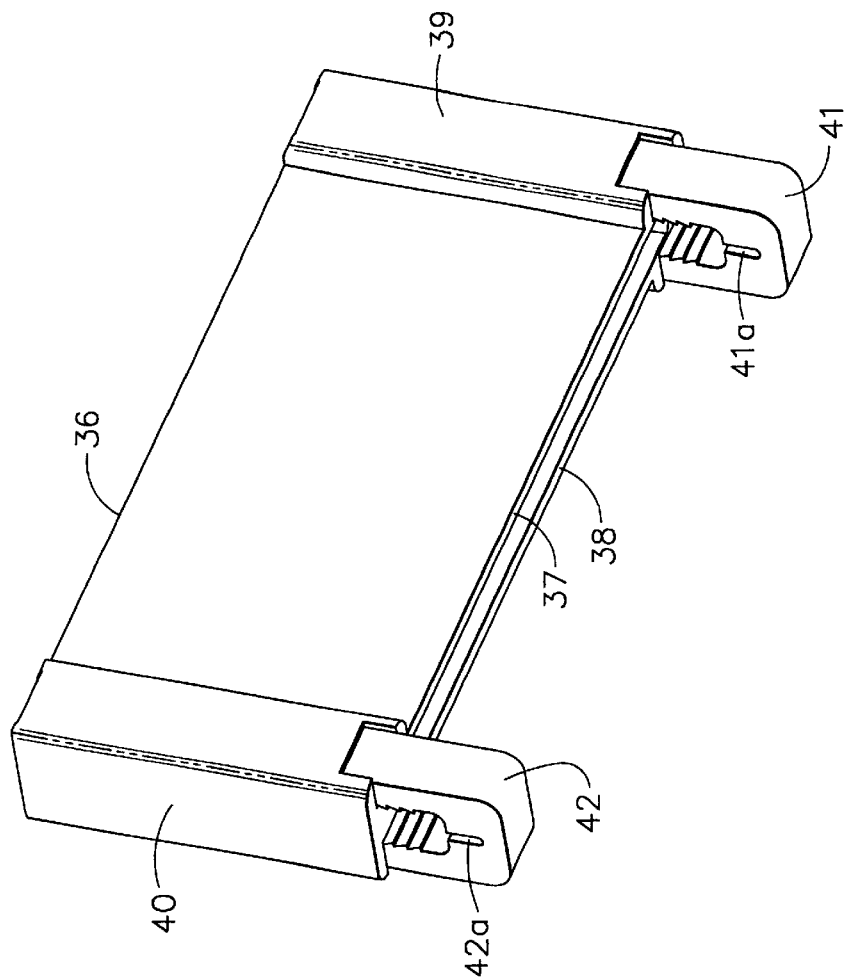
FIG. 13 is a bottom, side and end perspective view of another embodiment of the housing of the present invention.

The housing for security tag 35 is shown at 36 in FIG. 13. Housing 36 has a central pocket portion for receipt of security tag 35. The distance between the housing sides 37 and 38 enables the acceptance of the security tag 35 therebetween. The housing 36 has an overall length of about 2.06" and a top to bottom width of about 0.472" and a thickness of about 0.285".

The housing 36 is provided with ends 39 and 40 which close the ends of the pocket containing side walls 37 and 38. Ends 39 and 40 are identical to ends 9 and 10 except that they are shorter from top to bottom (as viewed in FIG. 12) having a top to bottom dimension of about 4 0.72". Each of ends 9 and 10 are provided with top to bottom perforations equivalent to perforations 18 and 19 of end member 9 and perforations 18a and 19a of end member 10. Perforations 18 and 19 of end member 9 and 18a and 19a of end member 10 have webs therebetween equivalent to webs 20 and 20a of FIG. 5. The webs of ends 39 and 40 are provided with teeth as shown at 21 and 22 for web 20 and at 21a and 22a for web 20a in FIG. 5.

The ends 39 and 40 of FIG. 10 may both be provided with notches equivalent to notches 27 and 28 of FIG. 9. Alternatively, they may be provided with notches equivalent to 27x–27y shown in FIG. 11.

The embodiment of FIG. 13 may be provided with a pair of clips 41 and 42 which may be identical to the clip of FIGS. 7 and 8, with the exception that they have an overall length of 0.50". The clips 41 and 42 may be provided with teeth of the type shown in FIGS. 7 and 9, or they may be provided with teeth of the type shown in FIG. 11. Each of clips 41 and 42 may have notches 41a and 42a, which are identical to notches 30 and 30a of FIG. 12, and are intended to serve the same purpose.

As in the case of housing 5, housing 36 lends itself well to being molded of plastic and to constitute a one-piece, integral, molded member. The top surface of housing 36 may be provided with a pair of holes equivalent to holes 16 and 17 of housing 5 (see FIGS. 4 and 5). Such holes serve the same purpose as holes 16 and 17. These holes may be eliminated in the embodiment of housing 36, particularly if the housing and the security tag therein are not intended for reuse.

It will be understood by one skilled in the art that housing 36 and security tag 35 will be used in precisely the same manner as housing 5 and security tag 1. Security tag 35 and housing 36 may be reused when accompanied by a new set of clips 41 and 42. Either of security tag 35 and housing 36 may be replaced. It is also within the scope of the invention to use a security tag 35 and housing 36 therefor once, and thereafter discard them.

The security tag 35 and housing 36 provide all of the advantages of security tag 1 and housing 5. Security tag 35 and housing 36 have the additional advantage of being smaller. As in the case of housing 5, the flat sides of housing 36 may support labels bearing appropriate indicia such as pricing information and bar code information. It is within the scope of the invention to print such information directly on the sides of housing 36. The loading of a security tag 35 in housing 36 and the application of housing 36 to the temple of an eyeglass frame lend themselves well to automation. Again, as in the case of housing 5, it would be within the scope of the invention to provide some housings 36 with no security tag, or with a simulated security tag. Some housings 36 could be molded without a pocket.

Modifications may be made in the invention without departing from the spirit of it. It will be understood that the dimensions and the shape of housings 5 and 36 could be modified to accommodate a sensor tag having a different shape and/or different dimensions.

The primary object of the present invention is to provide a housing which is capable of enclosing a sensor tag and affixing the housing to the temple of an eyeglass or the like by means which cannot be severed or destroyed by simple manual means such as a ring knife, a razor blade, or a pocket knife. For example, it would be possible to make the housing 5 or the housing 36 in two halves hinged together and appropriately notched so that the housing, containing an appropriate security tag could be closed about the temple of an eyeglass frame and maintained in a closed position by appropriate fasteners such as the clips above described or appropriate pin-like means having heads which must be severed to permit the housing to be opened and removed from the temple. A particular desired orientation of the housing with respect to the temple could be provided by the shape of the housing slots.

What is claimed is:

1. A security tag system for attaching to an article, said security tag system comprising:
   a. a security tag; and
   b. a holder comprising:
      i. a housing defining a cavity, said security tag being removably disposed in said cavity;
      ii. a first opening formed through said housing and in communication with said cavity, said first opening being configured complementary to said security tag so as to allow said security tag to be disposed in and removed from said cavity; and
      iii. at least one fastener member configured to secure said holder to said article in an orientation such that when said holder is secured to said article said first opening is at least partially blocked by said article such that said security tag cannot be removed from said cavity.

2. The security tag system of claim 1 wherein said at least one fastener member is configured such that it must be destroyed to release said housing from said article.

3. The security tag system of claim 1 wherein said at least one fastener member comprises a U-shaped member having a base portion and a pair of upstanding generally parallel legs extending from said base portion.

4. The security tag system of claim 1 wherein
   a. said housing comprises:
      i. a top and a bottom;
      ii. at least one bore formed in said housing and extending from said top to said bottom, said at least one bore including an associated sidewall; and
      iii. at least one respective tooth extending into said at least one bore from said associated sidewall; and
   b. said at least one fastener member includes at least one leg, said at least one leg including at least one respective tooth thereon configured and oriented to cooperate with said at least one tooth of said at least one bore when said at least one leg is disposed in said at least one bore.

5. The security tag system of claim 4 wherein said at least one bore comprises at least one pair of bores formed in said housing and extending from said top to said bottom, said bores being spaced from each other by a web, each said bore including an associated sidewall, each said associated sidewall including at least one respective tooth extending into its respective bore.

6. The security tag system of claim 4 wherein said at least one fastener member comprises a U-shaped member having a base portion, said at least one leg comprises a pair of upstanding generally parallel legs extending from said base portion, each of said legs including at least one respective tooth thereon configured and oriented to cooperate with said teeth extending from said sidewalls.

7. The security tag system of claim 4 wherein said at least one tooth of said at least one fastener member cooperates with said at least one tooth extending from said associated sidewall in such a way that said at least one fastener member must be destroyed to release said housing from said article.

8. The security tag system of claim 1 including a second opening formed through said housing and in communication with said cavity, whereby an appropriate tool can be inserted through said second opening to remove said security tag from said cavity through said first opening.

9. A security tag holder for attaching to an article, said security tag holder comprising:
   a. a housing defining a cavity, said cavity being configured to receive a security tag;
   b. a first opening formed through said housing and in communication with said cavity, said first opening being configured complementary to said security tag so as to allow said security tag to be disposed in and removed from said cavity; and
   c. at least one fastener member configured to secure said holder to said article in an orientation such that when said holder is secured to said article said opening is at least partially blocked by said article such that said security tag, when disposed in said cavity, cannot be removed from said cavity.

10. The security tag holder of claim 9 wherein said at least one fastener member is configured such that it must be destroyed to release said housing from said article.

11. The security tag holder of claim 9 wherein said at least one fastener member comprises a U-shaped member having a base portion and a pair of upstanding generally parallel legs extending from said base portion.

12. The security tag holder of claim 9 wherein
  a. said housing comprises:
    i. a top and a bottom;
    ii. at least one bore formed in said housing and extending from said top to said bottom, said at least one bore including an associated sidewall; and
    iii. at least one respective tooth extending into said at least one bore from said associated sidewall; and
  b. said at least one fastener member includes at least one leg, said at least one leg including at least one respective tooth thereon configured and oriented to cooperate with said at least one tooth of said at least one bore when said at least one leg is disposed in said at least one bore.

13. The security tag holder of claim 12 wherein said at least one bore comprises at least one pair of bores formed in said housing and extending from said top to said bottom, said bores being spaced from each other by a web, each said bore including an associated sidewall, each said associated sidewall including at least one respective tooth extending into its respective bore.

14. The security tag holder of claim 12 wherein said at least one fastener member comprises a U-shaped member having a base portion, said at least one leg comprises a pair of upstanding generally parallel legs extending from said base portion, each of said legs including at least one respective tooth thereon configured and oriented to cooperate with said teeth extending from said sidewalls.

15. The security tag holder of claim 12 wherein said at least one tooth of said at least one fastener member cooperates with said at least one tooth extending from said associated sidewall in such a way that said at least one fastener member must be destroyed to release said housing from said article.

16. The security tag holder of claim 9 including a second opening formed through said housing and in communication with said cavity, whereby an appropriate tool can be inserted through said second opening to remove said security tag from said cavity through said first opening.

17. A security tag system for attaching to an article, said security tag system comprising:
  a. a security tag; and
  b. a holder comprising:
    i. a housing having a top and a bottom and defining a cavity, said security tag being disposed in said cavity;
    ii. at least one pair of bores formed in said housing and extending from said top to said bottom, said bores being spaced from each other by a web, each said bore including an associated sidewall;
    iii. each said associated sidewall including at least one respective tooth extending into its respective bore; and
    iv. at least one fastener member, said at least one fastener member including at least one leg, said at least one leg including at least one respective tooth thereon configured and oriented to cooperate with said at least one tooth of said at least one bore when said at least one leg is disposed in said at least one bore, said at least one fastener member comprising a base portion, said base portion including a slot, said slot being configured to receive a portion of said article.

18. The security tag system of claim 17 wherein said housing includes two spaced apart ends, and said at least one pair of bores comprises a respective pair of bores formed at each respective end of said housing.

19. A security tag system for attaching to an article, said security tag system comprising:
  a. a security tag; and
  b. a holder comprising:
    i. a housing having a top and a bottom and defining a cavity, said security tag being disposed in said cavity, an opening formed through said housing and in communication with said cavity;
    ii. at least one bore formed in said housing and extending from said top to said bottom, said at least one bore including an associated sidewall;
    iii. at least one respective tooth extending into said at least one bore from said associated sidewall; and
    iv. at least one fastener member, said at least one fastener member including at least one leg, said at least one leg including at least one respective tooth thereon configured and oriented to cooperate with said at least one tooth of said at least one bore when said at least one leg is disposed in said at least one bore.

20. A security tag system for attaching to an article, said security tag system comprising:
  a. a security tag; and
  b. a holder comprising:
    i. a housing having a top and a bottom and defining a cavity, said security tag being disposed in said cavity;
    ii. an opening formed through said housing and in communication with said cavity, said opening being configured complementary to said security tag so as to allow said security tag to be inserted in and removed from said cavity;
    iii. at least one pair of bores formed in said housing and extending from said top to said bottom, said bores being spaced from each other by a web, each said bore including an associated sidewall;
    iv. each said associated sidewall including at least one respective tooth extending into its respective bore; and
    v. at least one fastener member, said at least one fastener member including at least one leg, said at least one leg including at least one respective tooth thereon configured and oriented to cooperate with said at least one tooth of said at least one bore when said at least one leg is disposed in said at least one bore, said at least one fastener member comprises a base portion, said base portion including a slot, said slot being configured to receive a portion of said article.

21. The security tag system of claim 20 wherein said housing includes two spaced apart ends, and said at least one pair of bores comprises a respective pair of bores formed at each respective end of said housing.

22. A security tag system for attaching to an article, said security tag system comprising:
  a. a security tag; and
  b. a holder comprising:
    i. a housing having a top and a bottom and defining a cavity, said security tag being disposed in said cavity;
    ii. at least one bore formed in said housing and extending from said top to said bottom, said at least one bore including an associated sidewall;

iii. a first opening formed through said housing and in communication with said cavity, said first opening being configured complementary to said security tag so as to allow said security tag to be inserted in and removed from said cavity iv. at least one respective tooth extending into said at least one bore from said associated sidewall;

v. at least one fastener member, said at least one fastener member including at least one leg, said at least one leg including at least one respective tooth thereon configured and oriented to cooperate with said at least one tooth of said at least one bore when said at least one leg is disposed in said at least one bore; and vi. a second opening formed through said housing and in communication with said cavity, whereby an appropriate tool can be inserted through said second opening to remove said security tag from said cavity through said first opening.

23. A security tag holder for attaching to an article, said security tag system comprising:

a. a housing having a top and a bottom and defining a cavity, said cavity being configured to receive a security tag;

b. at least one pair of bores formed in said housing and extending from said top to said bottom, said bores being spaced from each other by a web, each said bore including an associated sidewall;

c. each said associated sidewall including at least one respective tooth extending into its respective bore; and d. at least one fastener member, said at least one fastener member including at least one leg, said at least one leg including at least one respective tooth thereon configured and oriented to cooperate with said at least one tooth of said at least one bore when said at least one leg is disposed in said at least one bore, said at least one fastener member comprising a base portion, said base portion including a slot, said slot being configured to receive a portion of said article.

24. The security tag system of claim 23 wherein said housing includes two spaced apart ends, and said at least one pair of bores comprises a respective pair of bores formed at each respective end of said housing.

25. A security tag holder for attaching to an article, said security tag holder comprising:

a. a housing having a top and a bottom and defining a cavity, said cavity being configured to receive a security tag an opening formed through said housing and in communication with said cavity;

b. at least one bore formed in said housing and extending from said top to said bottom, said at least one bore including an associated sidewall;

c. at least one respective tooth extending into said at least one bore from said associated sidewall; and d. at least one fastener member, said at least one fastener member including at least one leg, said at least one leg including at least one respective tooth thereon configured and oriented to cooperate with said at least one tooth of said at least one bore when said at least one leg is disposed in said at least one bore.

26. A security tag holder for attaching to an article, said security tag holder comprising:

a. a housing having a top and a bottom and defining a cavity, said cavity being configured to receive a security tag;

b. an opening formed through said housing and in communication with said cavity, said opening being configured complementary to said security tag so as to allow said security tag to be inserted in and removed from said cavity;

c. at least one pair of bores formed in said housing and extending from said top to said bottom, said bores being spaced from each other by a web, each said bore including an associated sidewall;

d. each said associated sidewall including at least one respective tooth extending into its respective bore; and e. at least one fastener member, said at least one fastener member including at least one leg, said at least one leg including at least one respective tooth thereon configured and oriented to cooperate with said at least one tooth of said at least one bore when said at least one leg is disposed in said at least one bore, said at least one fastener member comprising a base portion, said base portion including a slot, said slot configured being to receive a portion of said article.

27. The security tag system of claim 26 wherein said housing includes two spaced apart ends, and said at least one pair of bores comprises a respective pair of bores formed at each respective end of said housing.

28. A security tag holder for attaching to an article, said security tag holder comprising:

a. a housing having a top and a bottom and defining a cavity, said cavity being configured to receive a security tag;

b. a first opening formed through said housing and in communication with said cavity, said first opening being configured complementary to said security tag so as to allow said security tag to be inserted in and removed from said cavity;

c. at least one bore formed in said housing and extending from said top to said bottom, said at least one bore including an associated sidewall;

d. at least one respective tooth extending into said at least one bore from said associated sidewall;

e. at least one fastener member, said at least one fastener member including at least one leg, said at least one leg including at least one respective tooth thereon configured and oriented to cooperate with said at least one tooth of said at least one bore when said at least one leg is disposed in said at least one bore; and f. a second opening formed through said housing and in communication with said cavity.

\* \* \* \* \*